A. A. BROWN.
NUT LOCK.
APPLICATION FILED JUNE 22, 1911.
1,017,845.
Patented Feb. 20, 1912.
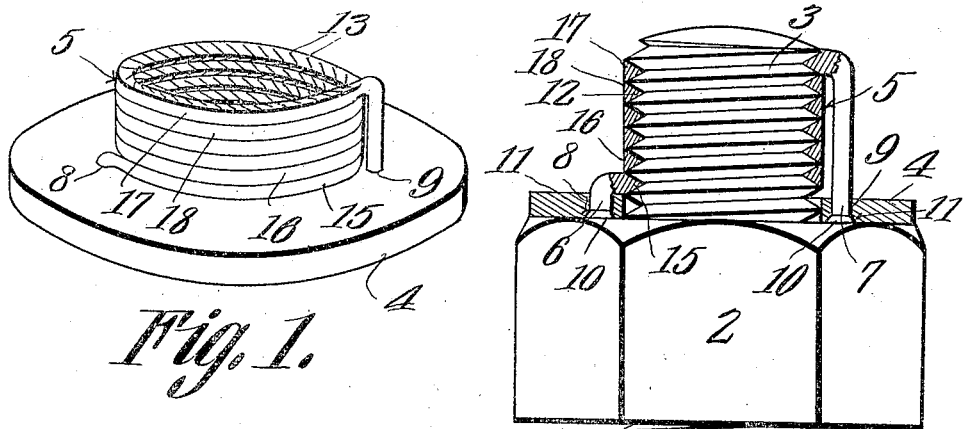
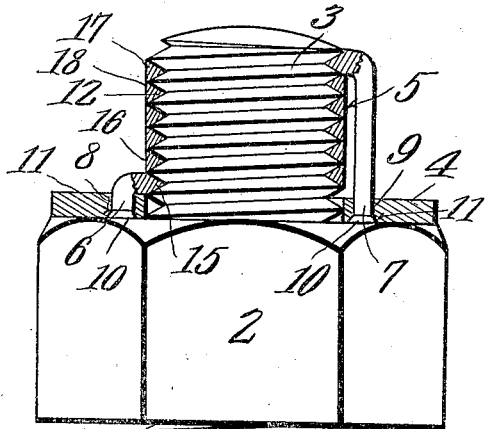
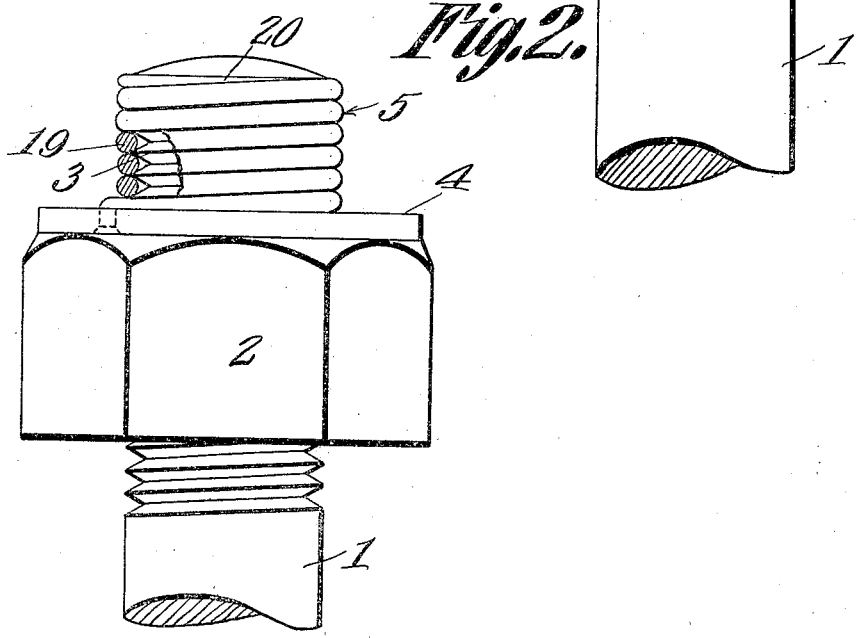
Witnesses
Frank B Wooden
E. Walton Brewington
Inventor
Aaron A. Brown
By Henry G. Brewington
Attorney

UNITED STATES PATENT OFFICE.

AARON A. BROWN, OF ROLAND PARK, MARYLAND.

NUT-LOCK.

1,017,845. Specification of Letters Patent. Patented Feb. 20, 1912.

Application filed June 22, 1911. Serial No. 634,775.

*To all whom it may concern:*

Be it known that I, AARON A. BROWN, a citizen of the United States, residing at Roland Park, in the county of Baltimore and State of Maryland, have invented certain new and useful Improvements in Nut-Locks, of which the following is a specification.

My invention relates to an improvement in nut-locks, and has for its object to provide a device of such character which is simple in operation, cheap as to manufacture, and strong, compact and durable, and effective for the purpose intended.

With the foregoing objects in view my invention consists of the improved construction, arrangement and combinations of parts which are fully described in the following specifications and pointed out in the appended claims.

In the accompanying drawings, in which I have illustrated an embodiment of my invention, Figure 1 represents a perspective view of the preferred form of my invention; Fig. 2 represents a view in elevation of a bolt and nut with the nut lock applied thereto, the latter being in section; Fig. 3 represents a view in elevation of a modified form as applied to a bolt.

Like reference characters mark the same parts wherever they occur in the various figures of the drawing.

Referring specifically to the drawings, 1 indicates a bolt, and 2 a nut, both being made from the usual material, and of the ordinary construction as at present in universal use. The threaded end 3 of the bolt projects or is extended through the nut 2 a sufficient distance upon which is secured the washer 4, having secured thereon the spiral coil 5, the coil being secured on the washer by means of the ends 6 and 7 thereof being inserted through the openings 8 and 9 respectively, and the ends being upset or headed in the opposite side of the openings as indicated at 10, the openings being countersunk at 11 for this purpose.

The coil is made from any suitable material, preferably spring steel wire and highly tempered, the wire being preferably substantially V shaped as indicated at 12, the V shaped surfaces being diagonally provided with ridges 13 similar to the cutting edge of a file, the coil being of a slightly less diameter than that of the bolt upon which it is screwably secured, as indicated in Fig. 2. When so secured, the V shaped edges of the wire forming the interior walls of the coil, engage with the threaded end 3 of the bolt, and any tendency of the nut 2 to become unscrewed from the bolt will cause the ridges 13 to bite or become embedded in the threaded end 3, and prevent the unscrewing of the nut.

The holding power of the device however is not dependent upon the V shaped edges of the coil, neither is it dependent upon the ridges 13, in as much as any tendency of the nut to become unscrewed will cause the coils to expand, and the pressure which would otherwise cause the coil to unwind, is absorbed by the coils 15, 16 etc., before reaching the coils 17, 18 etc., and the pressure on the coils 15, 16 etc., by the unscrewing of the nut causes the coils 17, 18 etc., to hug the threaded end of the bolt all the more, and thereby prevents the nut from becoming unscrewed. The coils also for the reasons stated absorb the pressure occasioned by shock and vibrations where the bolt is used in construction of machines and the like where such vibrations are occasioned.

In Fig. 3 the coil is shown made from round wire as indicated at 19, and with but one end of the coil secured to the washer, the upper end of the coil being free and tapered to fit the threads of the bolt as indicated at 20. This modified form is effective for securing the nut on the bolt for ordinary purposes, the preferred form being especially applicable where the strain on the nut is extraordinary occasioned by the character or purpose of the construction where used, such as on machines or in places where the jar and vibration would ordinarily cause the nut to be jarred loose or become unscrewed from the bolt.

I have shown the washer 4 as circular, but it is obvious that it may be made of any other outline. It is also obvious that the teeth or ridges 13 of the coil may be constructed in a different manner than that shown, and that they may be of other shapes than those illustrated. It is further obvious that the nut which is shown as hexagonal may be of any other polygonal outline. It is also obvious that the bolt may be of a different form from that shown, and that the coil may be secured on the washer in any other manner or by means other than that shown and illustrated.

Having fully described my invention, what I claim, and desire to secure by Letters Patent, is:—

1. A nut-lock comprising a bolt, a nut secured on the bolt, a washer having a spiral coil provided thereon, the inner walls of the coil being formed with substantially V-shaped teeth, adapted to screw on the end of the bolt outside of the nut, the surfaces of said V-shaped teeth of the coil being provided with ridges adapted to engage the sides of the teeth of the bolt for preventing the nut from turning on the bolt.

2. A nut-lock, comprising a bolt, a nut and means for preventing the nut from turning in one direction on the bolt, said means embodying a washer having a spiral coil secured thereto, the inner walls of said coil being adapted to screw on the bolt outside of the nut.

In testimony whereof I affix my signature in presence of two witnesses.

AARON A. BROWN.

Witnesses:
E. WALTON BREWINGTON,
BROWN M. ALLEN.